United States Patent [19]

Hablitzel et al.

[11] 4,121,869

[45] Oct. 24, 1978

[54] APPARATUS FOR PREVENTING DUST FROM SETTLING ON OR BEING BLOWN AGAINST A REAR WINDOW OF A VEHICLE

[75] Inventors: Hermann Hablitzel; Friedrich Goes, both of Wolfsburg, Fed. Rep. of Germany

[73] Assignee: Volkswagenwerk Aktiengesellschaft, Wolfsburg, Fed. Rep. of Germany

[21] Appl. No.: 591,718

[22] Filed: Jun. 30, 1975

[30] Foreign Application Priority Data

Jul. 4, 1974 [DE] Fed. Rep. of Germany ....... 2432114

[51] Int. Cl.² .................................................. B60J 3/00
[52] U.S. Cl. .................................. 296/97 R; 296/136
[58] Field of Search .................... 296/1 R, 15, 91, 135, 296/136, 97 R, 97 A, 97 C; 49/397, 87; 52/473, 202, 203, 74, 75; 16/149

[56] References Cited

U.S. PATENT DOCUMENTS

| 2,241,147 | 5/1941  | Maier ........................... 296/1 R |
| 2,485,263 | 10/1949 | Digby ............................. 49/87 |
| 2,819,499 | 1/1958  | Abramson et al. .................. 52/203 |
| 2,845,665 | 8/1958  | Place ............................. 49/397 |
| 3,331,161 | 7/1967  | Ruff ............................. 49/397 |
| 3,471,874 | 10/1969 | Dixon ......................... 16/149 X |

OTHER PUBLICATIONS

"Mustang '70", Auto Pamphlet, 1970, Box D-27.

Primary Examiner—Albert J. Makay
Assistant Examiner—D. W. Underwood
Attorney, Agent, or Firm—Brumbaugh, Graves, Donohue & Raymond

[57] ABSTRACT

Apparatus for preventing dust from settling on or being blown against a rear window of a vehicle has strip members arranged horizontally across the rear window. Each strip member defines a plane. The planes intersect substantially in a line at a rear view mirror in the vehicle so as to permit a rear view from the mirror through the rear window which is substantially unimpeded by the strip members. The strip members are additionally assembled on a frame which is detachably supported on the vehicle for removal when the vehicle passes through a washing or other device which may damage the strips and for ease in such occasional washing of the rear window as may be required even with use of the apparatus.

3 Claims, 5 Drawing Figures

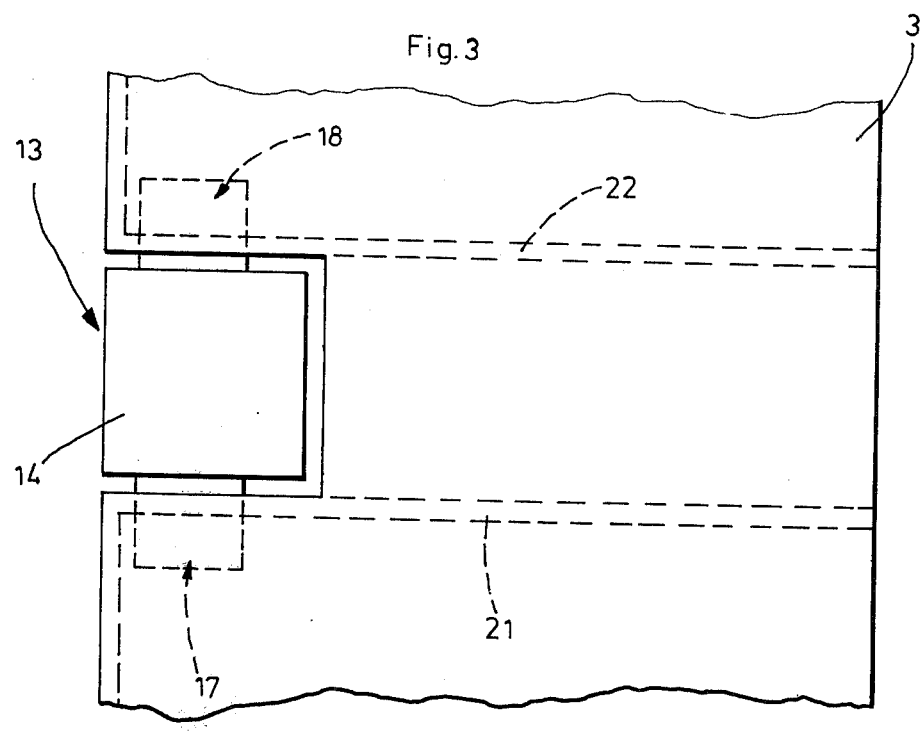
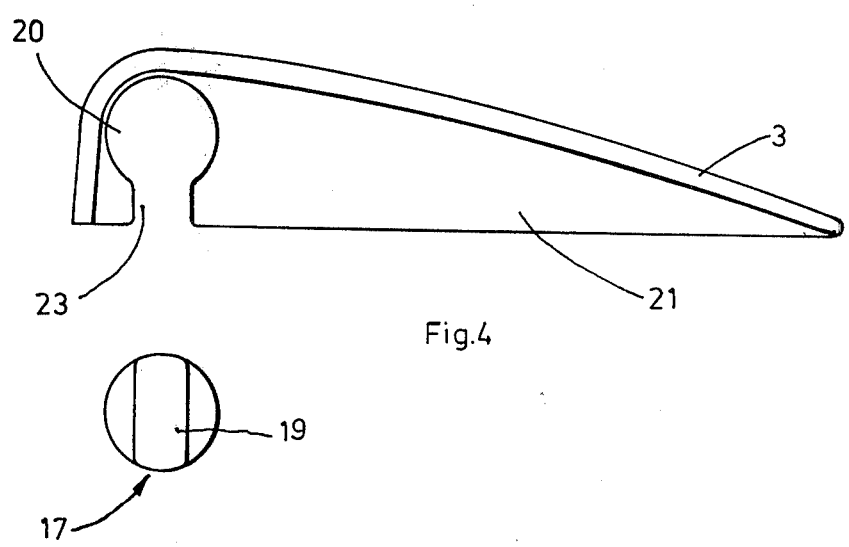

APPARATUS FOR PREVENTING DUST FROM SETTLING ON OR BEING BLOWN AGAINST A REAR WINDOW OF A VEHICLE

BACKGROUND OF THE INVENTION

The invention concerns a device for decreasing the soiling of the rear window of a vehicle, particularly an automobile, equipped with an inside rear view mirror. Comparatively steeply sloped rear windows are particularly subject to soiling by dust and dirt whirled up by the motion of the vehicle, for example from wheels thereof. Comparatively gradually sloped rear windows are particularly subject to soiling by dust and dirt settling on the window. The soiling easily attains such a degree that the inside rear view mirror becomes practically useless.

A window-wiper on the rear window has been used as one way of easily cleaning rear windows of vehicles. Wipers, however, require additional moving and energy-consuming parts, and even then clean only part of the rear window so that visibility through it from the rear view mirror still remains limited.

SUMMARY OF THE INVENTION

It is the purpose of the invention to provide apparatus which, without any additional moving or energy-consuming parts, keeps dust and dirt from being blown or settling on the rear window of the vehicle so as to keep unimpeded the rearward view therethrough from the rear view mirror without any impairment of the maximum rear angle of visibility through the window. Apparatus for this purpose is characterized by strip members arranged across the outside of the rear window on a frame extending between the strip members, planes defined by the strip members meeting on the rear view mirror.

Accordingly, the apparatus resembles a sunshade known for use on the rear window of automobiles. However, the apparatus performs a different or additional function and the planes of the strip members are inclined in a defined manner not required or even desirable for performing the sun-shade function. The angles of inclination of each strip member are chosen in such a manner that imaginary planes defined by and extending transversely of the strip members meet on the mirror, i.e., in the ideal case, they intersect substantially in a line extending across the mirror. In such a case, at least, the strip members appear as a thin line in the mirror image, the strip members themselves being thin. The line image in the rear view mirror does not significantly impair the view behind the vehicle in the rear view mirror.

In the preferred embodiment of the invention, the apparatus is detachably supported over the rear window. Inasmuch as it appears from the foregoing that the strip members will be made of the thinnest possible material to provide the thinnest line image in the mirror, it may be of advantage to remove the apparatus before the vehicle passes through certain devices for operating on the vehicle such as an automatic car wash installation.

DESCRIPTION OF THE DRAWINGS

A preferred embodiment of the invention will now be explained with the help of the figures, in which:

FIG. 3 presents an elevation along line III—III in FIG. 2;

FIG. 4 presents a detail of the detachable means for mounting the apparatus over the rear window, which means also appears in FIGS. 2 and 3.

DESCRIPTION OF THE PREFERRED EMBODIMENT

Figure 1:
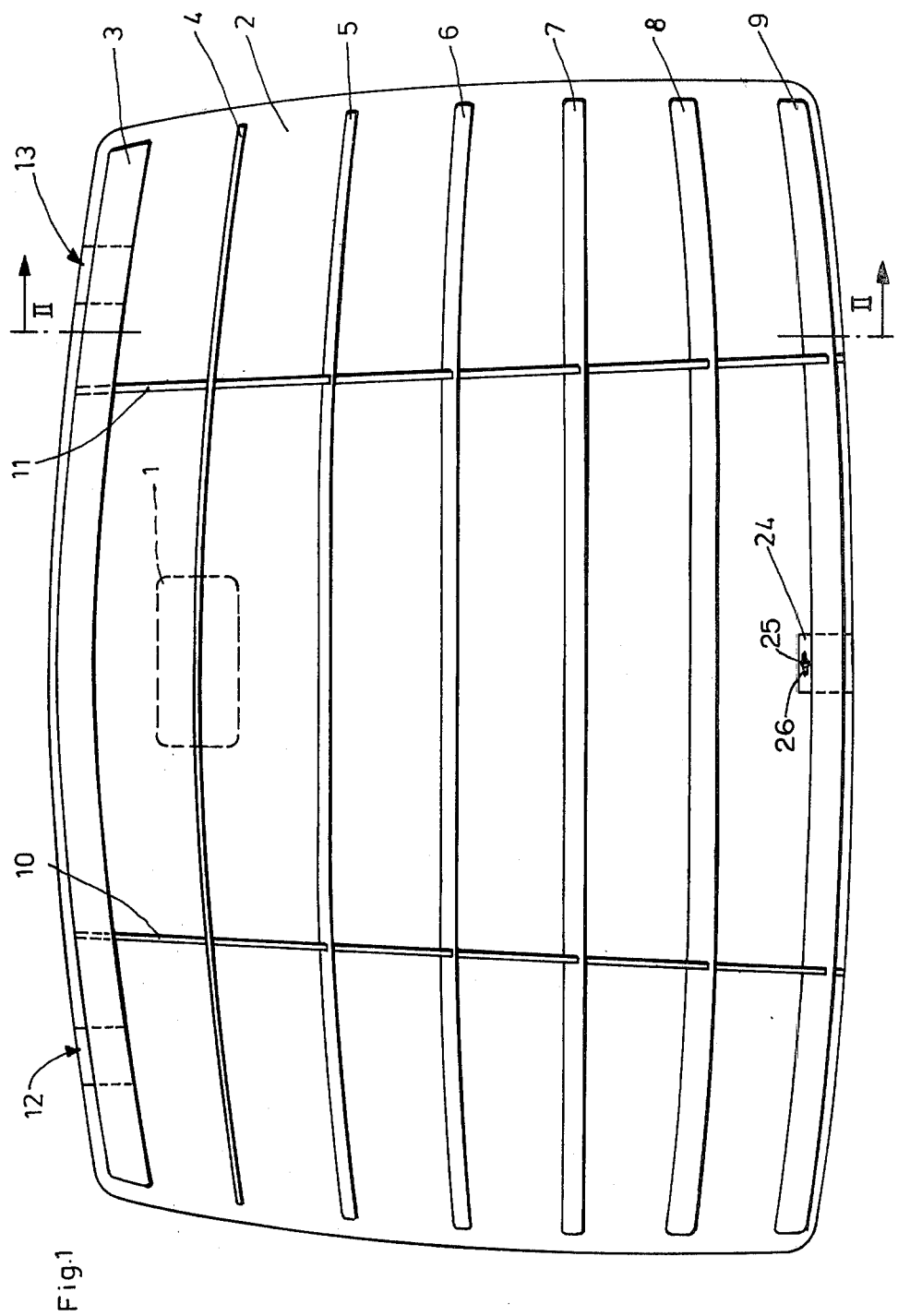
FIG. 1 shows an outside view of the rear window of a vehicle equipped with a preferred embodiment.

FIG. 1 shows a vehicle (V in FIG. 5) equipped with a rear view mirror inside the vehicle from a rear window 2. In accordance with the invention, apparatus is arranged over the outside of the rear window which in this preferred embodiment has as essential components seven strip members 3 to 9 extending approximately horizontally across the rear window. The strip members are connected with one another by a frame comprising two tie rods 10, and 11.

Figure 2:
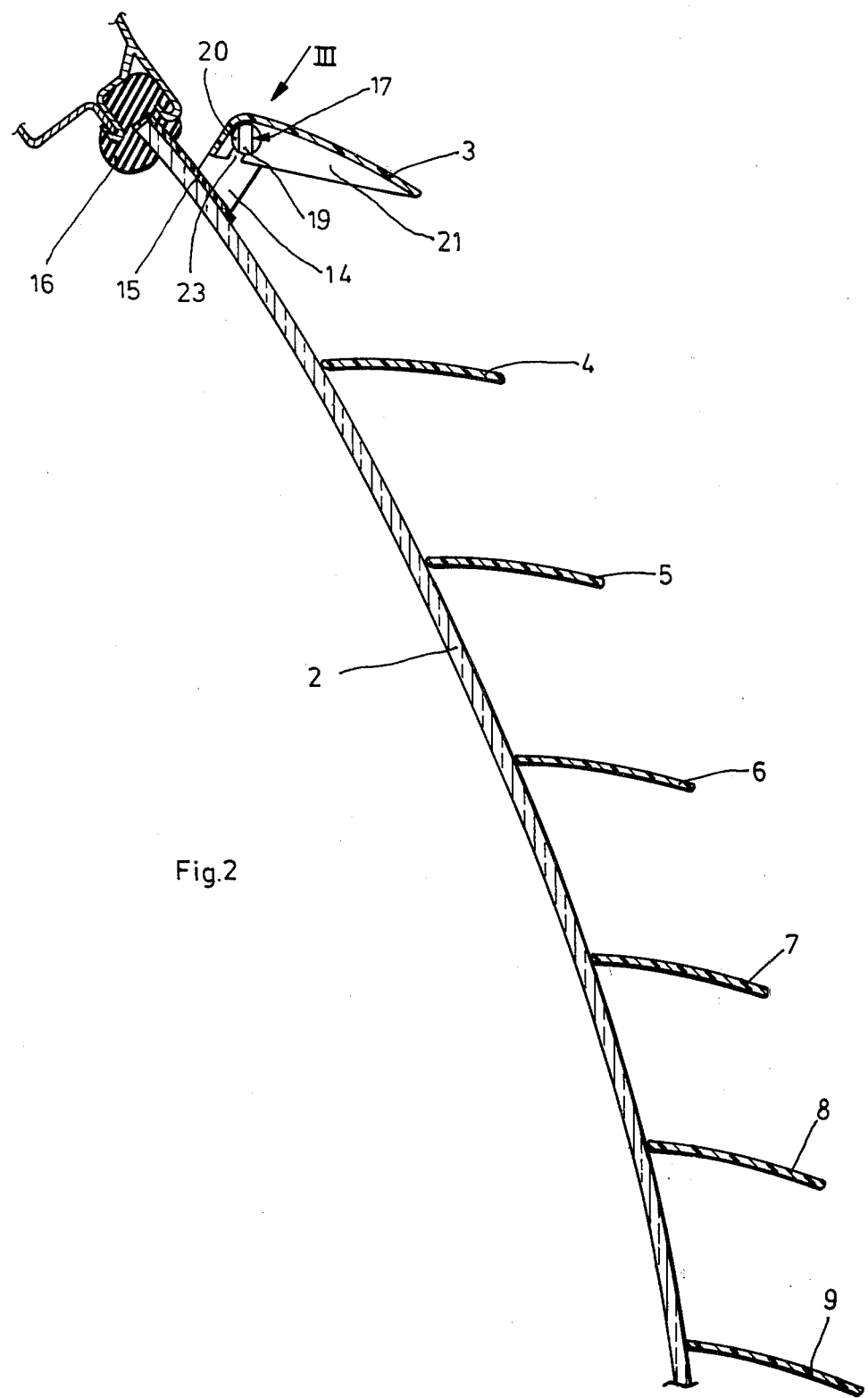
FIG. 2 shows a sectional view through line II—II in FIG. 1.

In this embodiment the strip members rest against the outside of the rear window 2, as may be seen specifically in FIG. 2. Moreover, FIGS. 1 and 2 show that the planes of the individual strip members 3 to 9 are inclined transverse of their length shown in FIG. 1 in such a manner that imaginary extensions of the planes meet in the mirror 1. The planes of the strip members are considered as taken over a section of the length of each strip member sufficiently short to define a plane transverse thereto, the actual strip members being vertically arcuate to approxmately conform to the peripheral shape of the window 2 as, for example, best seen with reference to strip member 4 in FIG. 1. Accordingly, a practically unobstructed rearward view through the rear view mirror 1 becomes possible.

Figure 5:
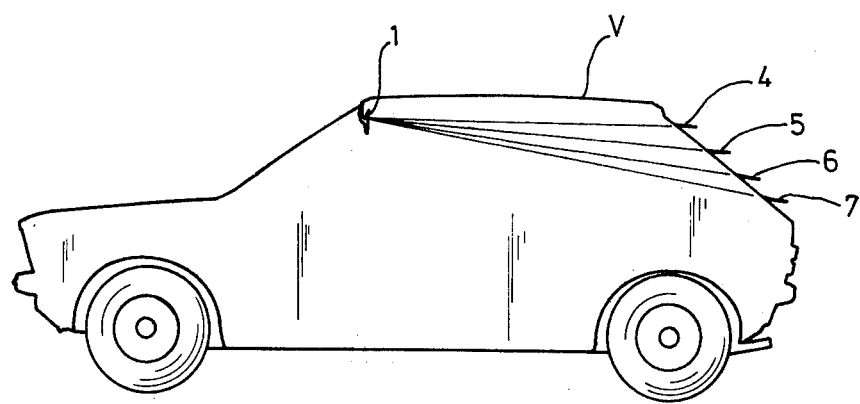
FIG. 5 is a schematic illustration of a vehicle on which the preferred embodiment is mounted.

FIG. 5 schematically confirms the intersection of the planes of some of the strip members, members 4-7, in the rear view mirror 1. The vehicle V is schematically illustrated as an automobile in which, as is well-known, the rear view mirror 1 is mounted on an inside portion of the vehicle such as a windshield adjacent the position from which the vehicle is operated, for example, in the middle of the vehicle. Lines representing the imaginary planes extending from the strip members are then shown as extensions of the cross-sections of the strip members shown in FIG. 5. These lines meet in a point on mirror 1, the point being the cross-section of the substantially line image of the strip members in the mirror.

The preferred embodiment represented in the figures can be detached from the vehicle. In this embodiment, it is suspended from the upper edge of the rear window with the help of holding means generally designated by 12 and 13, detailed structure of which will be further explained in connection with FIGS. 2 and 3, and, in the neighborhood of the lowest strip member 9, a releasable catch or locking device. The latter may consist of a rotating toggle bolt cemented onto the rear window 2 in the region of its lower edge, the toggle passing through a slotted element 24 on the lowest strip member 9 for releasable holding the embodiment against the window.

As shown in FIGS. 2 and 3, the holding means have support lugs 14 each having a transverse foot 15 at the upper edge of the rear window. The foot 15 thus is placed outside the customary edge seal 16 for the rear window of a vehicle thereby permitting normal sealing of the window to the vehicle.

As may be seen specifically in FIG. 3, the lugs 14 are each provided on either side with pivots 17 and 18 which are aligned with each other and extend transversely of the lug. As shown in FIG. 4, the pivots (only pivot 17 shown) have a key portion 19, which does not have a round cross section. Each of these pivots is engaged in an eye 20 in rib portions 21 and 22, respectively, on each side of an uppermost member 3. FIG. 4 shows that each eye (only one shown) is provided with a slot 23, which becomes narrower toward the outside of the rib. Only after the embodiment constituted by the strip members and the tie rods is swung into a position in which the slots 23 align with key portions 19 of the pivots, i.e. when the slots 23 have been turned counterclockwise from the position shown in FIG. 2, can the embodiment be lifted off the vehicle, the toggle 25 being turned to pass through a cooperative slot 26 of element 24 for releasing the lower part of the embodiment for the counterclockwise swinging about the pivots. The holding lugs 14 also constitute a lateral guides for the embodiment.

An elastic leg (not shown) may support at least one of the lower strips on the rear window to dampen vibration of the embodiment against the window.

Those in the art will readily conceive of variations and modifications of the invention described herein. Such variations and modifications are contemplated as within the scope of our invention as defined by the following claims.

We claim:

1. An apparatus for preventing dust and dirt from settling on or being blown against a rear window of a vehicle, such as an automobile, the vehicle being equipped with an inside rear view mirror, and the apparatus comprising strip members extending across the outside of the rear window and a frame extending between the strip members, the planes of the strip members substantially meeting on the mirror, the improvement comprising holding means, cooperating with an uppermost strip member for detachably supporting the frame and the strip members over the rear window, said holding means having at least one horizontally extending pivot with a key portion having a non-round cross section, the uppermost strip member having an eye with a slot for accommodating the key portion of the pivot, the slot releasing the pivot only after the apparatus is swung out of its position over the rear window.

2. Apparatus as in claim 1 wherein the uppermost strip member has a vertical rib in which the eye is arranged.

3. Apparatus as in claim 1 wherein the holding means has a holding lug fixed to the rear window and two pivots aligned with each other but on opposite sides of the common holding lug, each pivot projecting into an eye on the uppermost strip member.

* * * * *